United States Patent [19]

Nagano

[11] E Re. 30,524

[45] Reissued Feb. 24, 1981

[54] DERAILLEUR FOR A BICYCLE

[75] Inventor: Masashi Nagano, Osaka, Japan

[73] Assignee: Shimano Industrial Company Limited, Osaka, Japan

[21] Appl. No.: 793,366

[22] Filed: May 3, 1977

Related U.S. Patent Documents

Reissue of:

[64] Patent No.: 3,974,707
Issued: Aug. 17, 1976
Appl. No.: 557,989
Filed: Mar. 13, 1975

[30] Foreign Application Priority Data

| | | | |
|---|---|---|---|
| Aug. 3, 1974 | [JP] | Japan | 49-89314 |
| Aug. 6, 1974 | [JP] | Japan | 49-90447 |
| Sep. 6, 1974 | [JP] | Japan | 49-103137 |
| Oct. 12, 1974 | [JP] | Japan | 49-117481 |
| Oct. 23, 1974 | [JP] | Japan | 49-122954 |
| Feb. 25, 1975 | [JP] | Japan | 50-24394 |

[51] Int. Cl.[2] ..... F16H 7/22; F16H 7/00

[52] U.S. Cl. ..... 474/82; 74/501 R; 74/531

[58] Field of Search ..... 74/217 B, 242.11 B, 74/242.15 B, 242, 487, 501 R, 531; 280/237, 236, 238

[56] References Cited

U.S. PATENT DOCUMENTS

| | | | |
|---|---|---|---|
| 3,088,449 | 5/1963 | Hockaday et al. | 123/179 |
| 3,362,238 | 1/1968 | Hayashi et al. | 74/469 |
| 3,453,899 | 7/1969 | Tarutani et al. | 74/217 B |
| 3,742,777 | 7/1973 | Mathauser | 74/217 B |

FOREIGN PATENT DOCUMENTS

| | | | |
|---|---|---|---|
| 785015 | 7/1935 | France | 74/217 B |
| 801223 | 7/1936 | France | 74/217 B |
| 47985 | 8/1937 | France | 74/217 B |
| 823087 | 1/1938 | France | 74/217 B |
| 844108 | 7/1939 | France | 74/217 B |
| 858067 | 11/1940 | France | 74/217 B |
| 865713 | 12/1941 | France | 74/217 B |
| 962997 | 6/1950 | France | 74/217 B |
| 1087957 | 3/1955 | France | 74/217 B |
| 530913 | 3/1941 | United Kingdom | 74/217 B |
| 931849 | 7/1963 | United Kingdom | 74/217 B |
| 982986 | 2/1965 | United Kingdom | 74/217 B |

*Primary Examiner*—Samuel Scott
*Assistant Examiner*—Wesley S. Ratliff, Jr.
*Attorney, Agent, or Firm*—Stevens, Davis, Miller & Mosher

[57] ABSTRACT

A derailleur for a bicycle, which comprises four members, including a fitting member, two linkage members and a movable member, all movable with respect to each other. Between two of the members there is a device for positioning cages having chain-guide pulleys mounted on the movable member, whereby the derailleur enables the cages to be properly positioned and kept in the position at each speed-change stage of the bicycle so that an accurate and light speed-change operation may be performed.

26 Claims, 14 Drawing Figures

Figure 1:
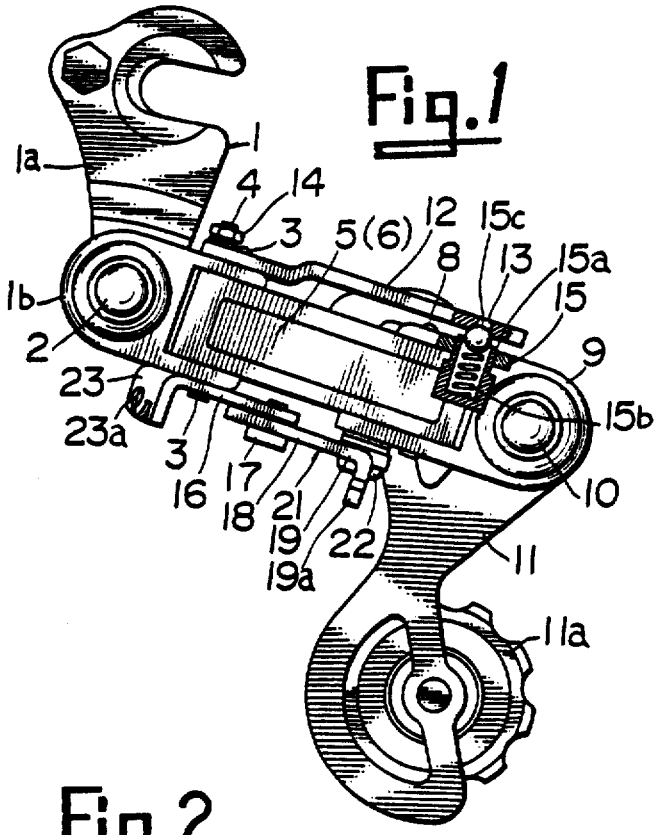

1a
1
4
14
3
5(6)
12
15c
8
13
15a
15
1b
2
9
23
23a
15b
3
16
17
18
21
19
19a
22
10
11
11a 11
12b
14
4
12
11a
1
1b
9
2
3
5
12
15
13

1a
1
1b
3
4
6(5)
12
7
8
9
2
6a
40
23
23a
3
4
42
16
17
21
19
19a
10
11
11a 12
13
15c
15b 12
13
12a
12b 11a
1a
3
5
11
1
IX
1b
2
4
6
13
12
8
7
10
9
IX

Fig. 12
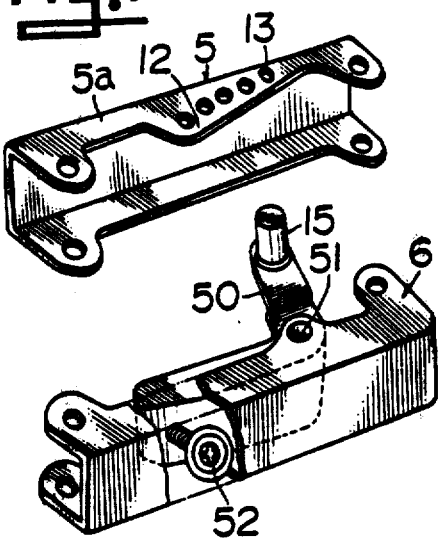
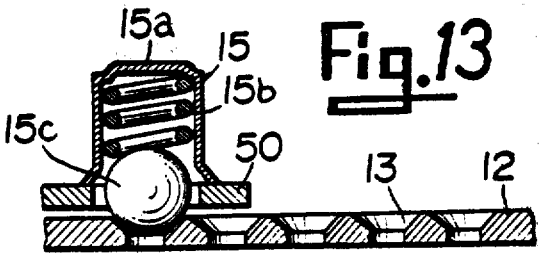
Fig. 13

DERAILLEUR FOR A BICYCLE

Matter enclosed in heavy brackets [ ] appears in the original patent but forms no part of this reissue specification; matter printed in italics indicates the additions made by reissue.

This invention relates to a derailleur for a bicycle, and particularly relates to a derailleur operable to selectively introduce a driving chain to one of the sprockets, each having a different number of teeth, of a multi-speed transmitting freewheel which is mounted on a rear wheel hub of the bicycle to be used together with the derailleur.

Conventionally, this kind of derailleur is, as suggested in British Pat. Nos. [885,511] *888,511* and 982,986, composed of a member for fitting the derailleur on a bicycle, two parallel linkage members pivotally mounted to the fitting member, a movable member which has chain-guide pulleys and is pivotally mounted to the two linkage members, and a return spring urging the movable member in one direction only. The speed-change by the derailleur is carried out in a manner such that an operating lever pulls control wires so as to allow the movable member to be swingingly moved against a return spring force or to be restored by the spring force; thus, a drive-chain is selectively introduced from the pulleys to one of the sprockets of the multi-speed transmitting wheel.

The conventional derailleur employing the return spring as aforegoing, requires not only great strength for changing speed by pulling the control wires against the return spring but also requires a frictional resistance stronger than the return spring force for keeping the chain-guide pulleys in position after changing the speed. Accordingly, great strength is required to operate the lever in the direction of as well as against the spring force.

Since the abovementioned frictional resistance, as shown in French Pat. No. 984,434, usually yields from the lever for operating the derailleur and no mechanism for positioning the chain-guide pulleys is provided, when charging the speed a cyclist is obliged to select the proper position of the pulleys only by his touch; hence, the conventional derailleur has a problem in that the driving chain can [now] *not* be exactly introduced for changing the bicycle speed.

U.S. Pat. No. 3,362,238 and U.S. Pat. No. 3,394,604 suggest that at an operating lever or a lever-holder thereof there are provided engageable holes each having a spaced interval therebetween corresponding to the selected speed-change stage, and that a ball is provided at the lever or holder to be engageable with the holes so that the chain-guide pulleys may be kept in position for speed change. In this instance, the ball is so engaged with the hole that the derailler can be mechanically positioned at a proper speed-change stage to result in a theoretically accurate speed-change operation; however, since the derailleur is operated by the lever through the control wire, occurrence of surplus exension of the wire or contraction of the outer cable may cause the movable member of the derailleur to be out of [order,] *alignment,* resulting in inaccurate speed-change operation.

Especially in this construction, the lever action to position the derailleur is not noticed by the cyclist. As a result, either the chain introduction is not normal and the cyclist does not notice it at once, or, if he notices it, he will have difficulty adjusting the derailleur to a proper speed-change stage.

This invention has been designed to solve the abovementioned problems.

A main object of the invention is the provision of a derailleur capable of always accurately introducing a driving chain from one of the sprockets to another when changing the bicycle speed.

Another object of the invention is the provision of a derailleur capable of always accurately introducing a driving chain in spite of surplus extension of a control wire or contraction of an outer cable having the wire therein.

Still another object of the invention is the provision of a derailleur operable with an operating lever for introducing a driving chain to a sprocket with a light touch of a cyclist.

A further object of the invention is the provision of a derailleur operable with an operating lever for introducing a driving chain to a sprocket in the absence of a return spring.

Still a further object of the invention is the provision of a derailleur capable of being exactly kept in a proper speed-change position without the frictional resistance applied to an operating lever.

The present invention is directed to provide a derailleur which is so constructed that a positioning device is formed between two members relatively movable with respect to each other among four elemental members composed of the derailleur, such as, a fitting member, two linkage members and a movable member with guide pulleys, which two members are, for example, the fitting member and the movable member or the linkage member, the movable member and the linkage member, or one linkage member and the other linkage member is parallel thereto. The positioning device is composed of a holder having a plurality of engageable portions and a retainer engageable therewith.

Figure 2:
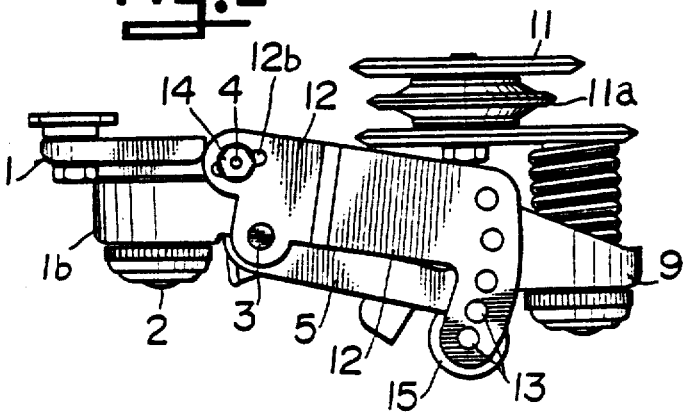
Figure 3:
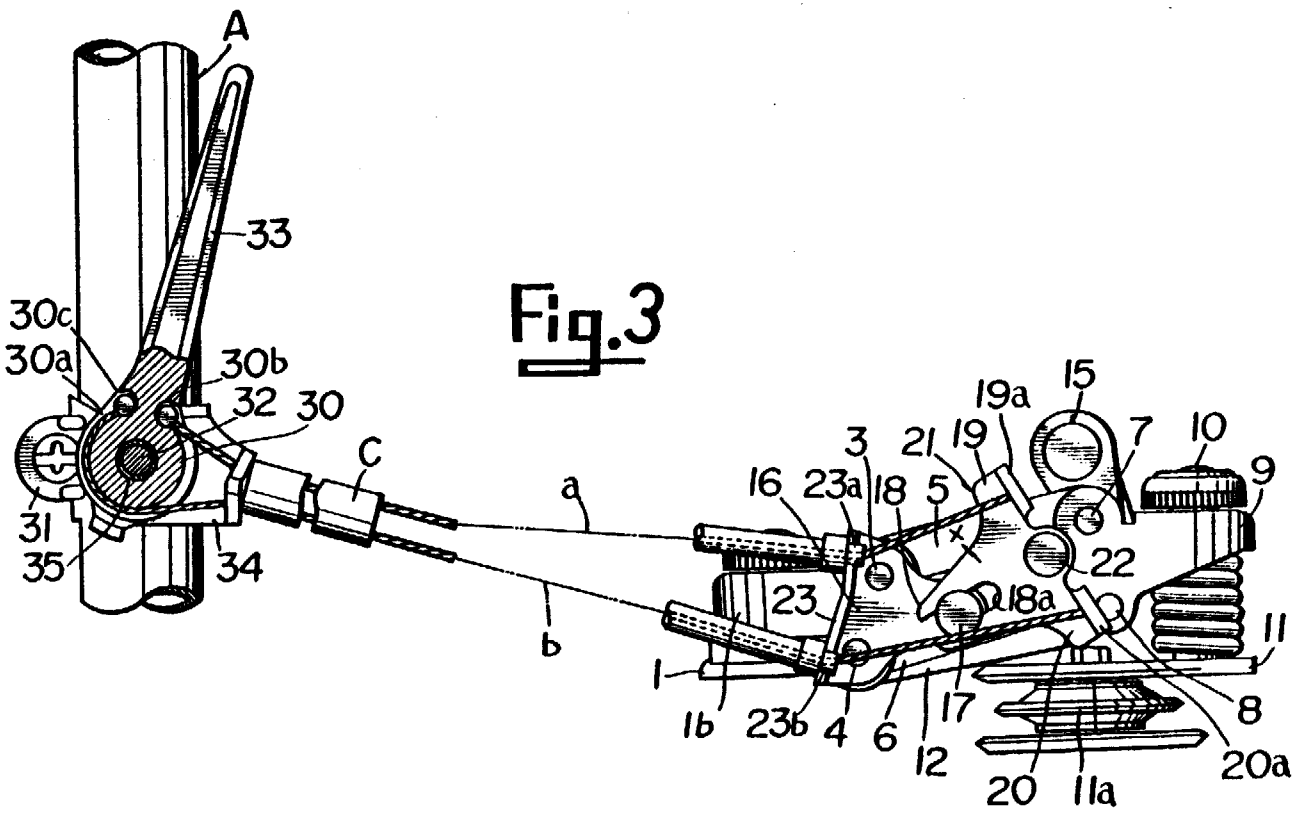

The abovementioned objects and others will be apparent from the following description in accordance with the accompanying drawings, in which:

FIG. 1 is a front view of a derailleur of the invention, which is so constructed that the holder is mounted to the fitting member and the retainer to the movable member, FIG. 2 is a [plane] *plan* view of the derailleur in FIG. 1, FIG. 3 is an illustration of the derailleur in FIGS. 1 and 2, showing the rear side thereof combined with an operating mechanism including an operating lever partially cut away.

Figures 4, 5, 6, 7:
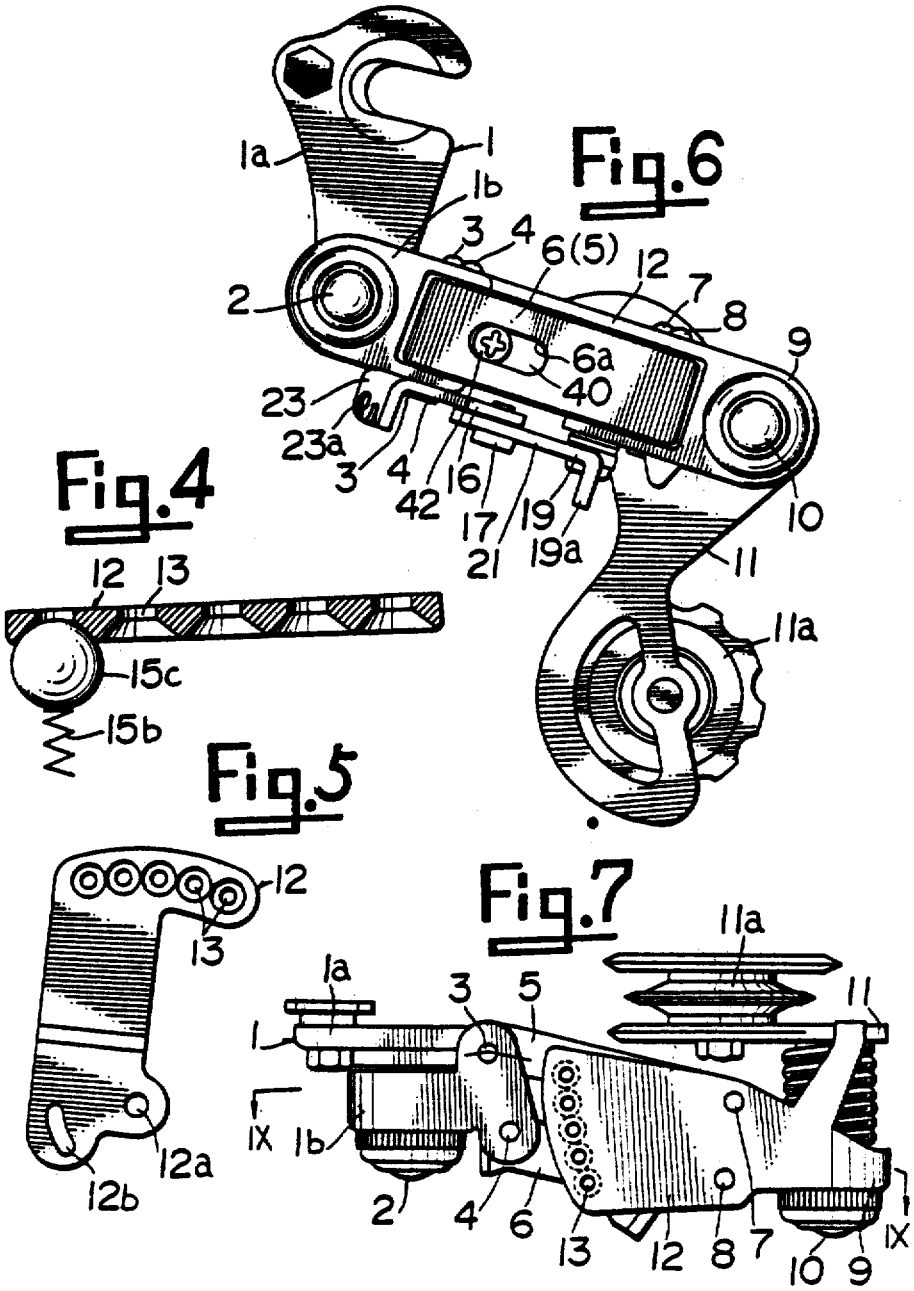
Figure 8:
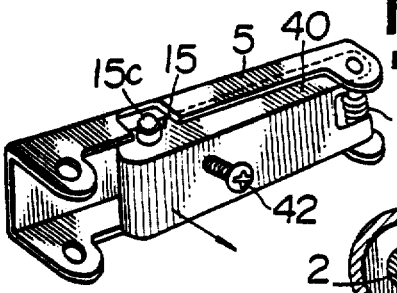
Figure 9:
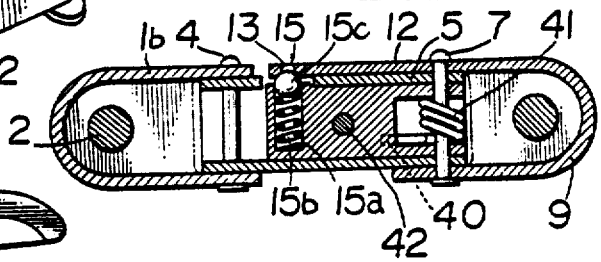
Figure 10:
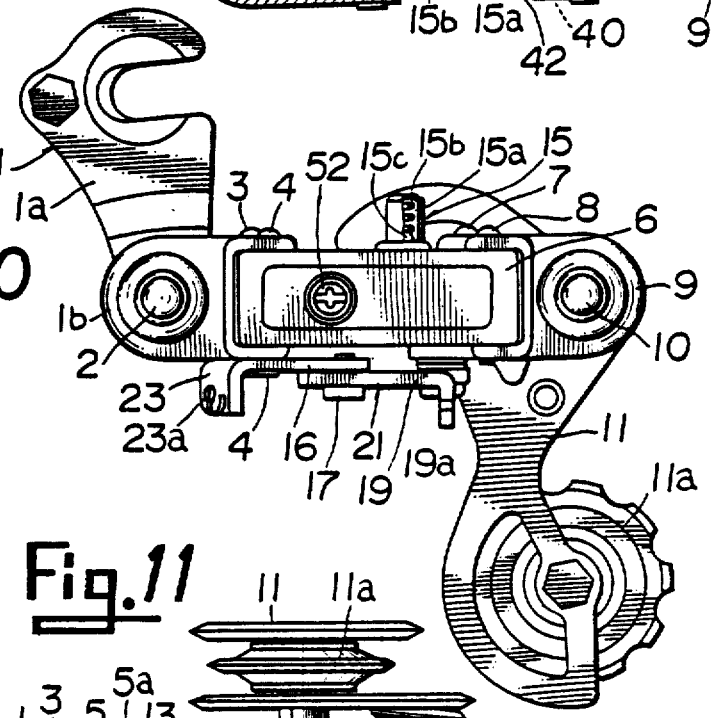
Figure 11:
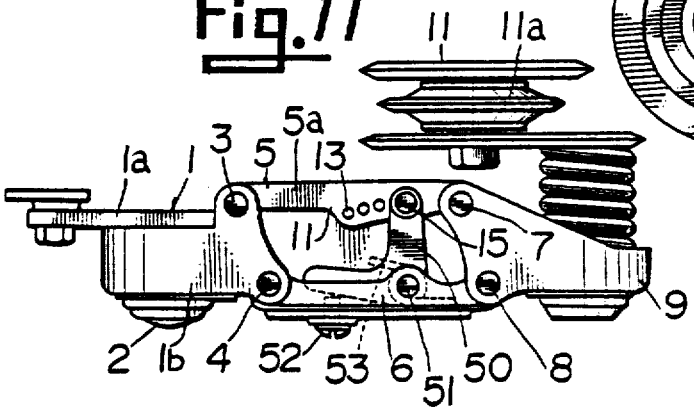
Figure 14:
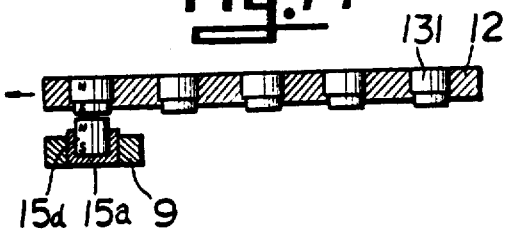

FIG. 4 is a diametrical sectional view showing engagement of a retainer with a holder of the derailleur in FIG. 1 through FIG. 3, FIG. 5 is a [plane] *plan* view of only the holder thereof, FIG. 6 is a front view of a derailleur having the holder mounted to the movable member and the retainer mounted to the linkage members, FIG. 7 is a [plane] *plan* view of the derailleur in FIG. 6, FIG. 8 is a perspective view showing only the linkage members of the derailleur in FIGS. 6 and 7, FIG. 9 is a sectional view of the derailleur taken on Line IX—IX in FIG. 7, FIG. 10 is a front view of a derailleur in which the holder is mounted to one of the linkage members and the retainer is mounted to the other linkage member opposite to the former one, FIG. 11 is a [plane] *plan* view of the derailleur of FIG. 10, FIG. 12 is a perspective view of only the linkage member of FIG. 11, FIG. 13 is a sectional view showing the engagement of the retainer with the recesses of the derailleur of FIGS. 10 and 11, and FIG. 14, is a sectional view of a modified embodiment showing engagement of the retainer with the engageable portion at the holder.

A derailleur of the invention is, as shown in FIGS. 1 through 3, 6 to 7 and 10 to 11, basically composed of four members, such as, a fitting member designated with the reference numeral 1, two parallel linkage members 5 and 6, and a movable member 9. The fitting member 1 comprises a bracket 1a to be fixed to a fork end of a bicycle frame (not shown) together with a hub shaft (not shown), and a body 1b attached swingingly movable only in a given range with respect to the bracket 1a through a pivot 2. The body 1b is allowed to be pivotally movable with respect to the bracket 1a but is immovably fixed in the moving direction of the movable member 9.

The body 1b is provided at one side thereof with opposite noses to which two linkage members 5 and 6 are pivotaly supported at each one end thereof through two pins 3 and 4.

The linkage members 5 and 6, equal in length and of a C-like shape [section] *cross-section* respectively, are mounted to the body 1b of the fitting member oppositely to each other at each open side of the same. At the foremost ends of the linkage members is pivotally supported the movable member 9 through pins 7 and 8.

The movable member 9 is formed substantially similarly to the body 1b, which has at one side thereof two opposite noses pivotally supporting the linkage member 5 and 6 therebetween through the pins 7 and 8 in the relationship that both the movable member and the linkage members are swingingly movable with each other. At the other side of the movable member 9 are mounted cages 11 carrying two chain-guide pulleys 11a therewith through a pivot 10 which is directed the same as the pivot 2 so that the cages may be turned around the pivot 10 only in a given range.

The chain-guide pulleys 11a serve to carry a driving chain (not shown) thereon and move in the axial direction of the multi-speed transmitting freewheel (not shown) so that the chain may be introduced from the pulleys to a selective sprocket of the freewheel to be in engagement therewith for changing the bicycle speed.

The basic construction of the derailleur has been described as a foregoing, which is not different at all from a well known one.

The invention is directed to provide in the derailleur constructed as aforegoing a positioning device described hereinafter between two members relatively movable with respect to each other during the speed-change operation, namely, between the fitting member 1 and the movable member 9 or the linkage member 5 or 6, the movable member 9 and the linkage member 5 or 6, or the two linkage members 5 and 6. The positioning device serves to selectively determine or maintain a proper position where the chain-guide pulleys 11a are to be kept during the speed-change operation, and cmprises a holder 12 with engageable portions 13 as many as there are speed-change stages, and a retainer 15 engageable with each of the portions 13.

Now, a derailleur which is provided with the holder 12 mounted to the body 1b of the fitting member 1 and the retainer 15 mounted to the movable member 9, will be described in the following, referring to FIGS. 1 through 5.

In this construction, the holder 12 is formed of a piece of metal plate, at the base of which are formed a round hole 12a and an elongated round hole 12b. The former is inserted with the pin 3 through which the one linkage member 5 is pivotally mounted to be swingingly movable around the pin 3, and the latter is inserted with the pin 4 at a threaded extension thereof and a lock nut 14 is screwed to fix the holder 12 to the body 1b of the fitting member 1. The holder 12 extends at the foremost end thereof toward the movable member 9 so as to reach each one end portion of the linkage members 5 and 6, and has the engageable portions 13 formed at the foremost end thereof. The engageable portions are, as shown in FIG. 4, mainly composed of a plurality of through holes which are each arranged at a given interval corresponding to the travel of the retainer 15 or the movable member 9 every speed-change state, and along the path of the retainer 15 motion when changing the bicycle speed. In this instance, the through holes are formed with one side open in a dish-like shape respectively so that each interval between two adjacent holes becomes a chevron shape. Hence, when located at the slope, the retainer 15 may slip down into any one of the engageable portions 13 so as to be in engagement therewith.

The retainer 15 engageable with the engageable portions 13 is, as shown in FIG. 1, mounted to the movable member 9, and comprises a cylindrical holder 15a and a ball 15c which is received within and partially outwardly protrudes from the holder 15a by being urged with a helical coiled spring 15b in the holder so that the ball 15c is allowed to be engaged with any one of the engageable portions 13. Thus, the engagement of the ball 15c with the engageable portions 13 is maintained with the spring 15b, whereby, the movable member 9 is prevented from being easily moved of itself.

When the ball 15c is in engagement with each of the engageable portions 13, it is necessary for the guide pulleys 11a to correspond to the position of each sprocket of the multi-speed transmitting freewheel.

Therefore, when fixed to the fitting body 1b, the holder 12 must first be swingingly moved around the pin 3 to be adjusted in a proper position and then tightened with the nut 14.

The movable member 9 as aforegoing is operated in a swinging motion for changing the speed with two control wires a and b. Such operation will be concretely described in the following manner. Referring to FIG. 3, to the body 1b of the fitting member is fixed a substantially triangular plate 16 which is provided at the top thereof with a fixed pin 17 and at the base thereof with a bent end 23 having two holes 23a and 23b for inserting two control wires therethrough. Another plate 21 is movably pivotally mounted to the movable member 9 through a pin 22, which has a cutout 18a formed at a fork end 18 at the foremost end of the plate, two arms 19 and 20 formed substantially rectangularly of the fork end and two bent ends 19a and 20a of the arms for retaining the control wire terminals therewith respectively. Then, the two control wires are inserted through the holes 23a and 23b and retained at terminals thereof to the retaining end portions 19a and 20a, whereby the movable plate 21 is turned in the direction of the arrow X in FIG. 3 by pulling one wire a so that the linkage member 5 may be moved as indicated with the solid line in FIG. 3 under control of the cutout 18a and the pin 17 engageable therewith.

A means for operating two control wires a and b is, as shown in FIG. 3, so formed that a wind-up body 30 has the control wires wound up thereto from the reverse side to the lever operation to pull either one of wires a and b by turning the body 30 in the normal or reverse direction thereof.

Next, the wind-up body 30 with an operable portion for pulling the wires, will be described in the following manner according to FIG. 3.

The wind-up body 30 shown in FIG. 3, is freely totatably supported to a fixed shaft 32 which is projected from a tight-band 31 retained on a handle bar A of a bicycle, and radially extends at one side to form a lever 33 of a given length.

The wind-up body 30 is provided with a wire-guide groove 30a surrounding a greater part of the outer periphery of the body, which groove 30a has at both ends thereof recesses 30b and 30c receiving therein [swollen] *enlarged* portions at the terminals of wires a and b respectively.

In addition, in FIG. 3, a fixed plate 34 is immovably fitted to the band 31 for holding an outer cable C to the plate and a sleeve 35 is inserted into the center hole of wind-up body 30. The sleeve 35 is made slightly longer than the axial length of the wind-up body 30 so as to make the wind-up body 30 freely lightly rotatable through the same. The sleeve 35 and washers (not shown) in contact with each other, are rigidly fixed to the fixed shaft 32 by being screwed with a lock nut (not shown).

Thus, the wind-up body 30 becomes rotatable around the sleeve 35 without any interruption so that a cyclist can operate the lever 33 to pull one of wires a and b by gripping it with a minute strength, where turning the lever is one direction pulls one of the wires and releases the other wire.

Besides the abovementioned example, bearings are simply substituted for the wind-up body 30 by utilizing an outer race thereof. Furthermore, other than use of two wires, one wire may be available to be wound to the body 30 and fixed to the middle portion thereof with a setscrew or the like.

In the abovementioned construction, the speed-change is so carried out that one control wire a or b is pulled to move the movable member 9 for introducing the driving chain to one of the sprockets at the desired speed-change stage, where the retainer 15 is simultaneously moved to enter into one of the engageable portions 13 corresponding to the desired speed-change stage, so that the movable member 9, and the chain guide pulleys 11a, may be properly positioned with respect to a selected sprocket of the multi-speed transmitting freewheel.

Now, the positioning device as aforegoing has the holder 12 mounted to the fitting body 1b and the retainer 15 to the movable member 9. Besides this, the holder 12 may, as shown in FIGS. 6–9, be mounted to the movable member 9 and the retainer 15 to an adjusted 40 swingingly movable together with the linkage members 5 and 6.

In FIGS. 6 and 7, the holder 12 is formed integrally [of] *with* the movable member 9 and comprises a plate member which is extending at the foremost end thereof toward the fitting body 1b to reach the base of linkage members 5 and 6. At the foremost end the holder 12 is provided with a plurality of engageable portions 13 which are disposed at spaced intervals each of a given length corresponding to the travel of the end portion [every speed-change stage, along the path of the moving end portion following the movable member 9 in swinging motion.] *with the movable member 9 through every speed change stage.* Both the engageable portions 13 and the retainer 15 are the same as the aforesaid example, but the latter is, as shown in the FIGS. 8 and 9, mounted onto the upper surface of the adjuster 40.

The adjuster 40 is pivotally mounted at the base thereof to one end portion of linkage member 5 along the inner surface thereof through the pin 7 and is always urged at the foremost end thereof toward the vertical inner surface of the linkage member 5 by means of a coiled spring 41. The foremost end of the adjuster 40 is located at the side of the fitting body 1b to correspond to each of the engageable portions 13.

Also, the adjuster 40 is provided at the middle portion thereof with a threaded bore which is screwably engaged with an adjusting bolt 42 of which the point is in abutment against the vertical inner surface of the linkage member 5.

The adjuster 40 properly adjusts the retainer 15 in position in a manner [that at first] *such that* the guide pulleys 11a are, in the same manner as in the aforesaid embodiment, allowed to be positioned corresponding to one selective sprocket of the multi-speed transmitting freewheel (not shown), and then the adjuster 40 is swingingly moved around the pin 7 by screwing the bolt 42 forwardly or backwardly so that the retainer 15 may properly be in engagement with one of the engageable portions 13 of the holder 12 at the setting position of the guide pulleys, for example, at the low speed stage, whereby the engageable portions 13 may meet each speed-change stage. When mounted to the adjuster 40, the adjusting bolt 42, as shown in FIG. 6, faces at the head thereof an elongated round hole 6a formed at the vertical wall of the linkage member 6 so as to be adjustable from the outside; additionally the adjusting bolt 42 may be attached to the linkage member 5 other than to the adjuster 40.

In the abovementioned construction, it is possible to provide the retainer 15 at the fitting body 1b and also, to provide, as shown in FIGS. 10 through 12, the holder 12 at one member 5 of the two linkage members 5 and 6 and the retainer 15 at the other 6 of the same.

The construction in the latter case will be described as follows. The holder 12 is, as shown in FIGS. 11 and 12, so formed that the upper horizontal wall 5a of the C-like shaped linkage member 5 is partially extended in projection toward the opposite linkage member 6, and is provided with a plurality of the same engageable protrusions in the aforesaid embodiment, at the portion of the upper wall and the extension, where if wide enough, the upper wall 5a may itself be the holder 12. The retainer 15 comprises in the same manner as in the aforesaid embodiment, a cylindrical holder 15a and a ball 15c which is received within the holder 15a to be urged outwardly thereof by means of a helical coiled spring 15b. The retainer 15 is, as shown in FIGS. 11 and 12, attached to a horizontal L-shaped member 50 to be carried therewith, which member 50 is pivotally supported through a pin 51 to the linkage member 6 opposite to the linkage member 5 serving as the holder 12. The member 50 is formed of a body and an arm extending rectangularly of the upper one end of the body, which arm is, as shown in FIGS. 12 and 13, made of a relatively thin plate and bent halfway so as to be movable above the upper surface of the wall 5a of the linkage member 5. Thus, the retainer 15 is fixed upside down to the foremost end of the arm so that the ball 15c may, as shown in FIG. 13, be engageable with each of the engageable portions 13 by being downwardly projected through the arm.

Incidentally, beside the abovementioned mounting to the linkage member 6, the retainer 15 may be mounted to an arm fixed to the linkage member 6 or an arm extending from the movable member 9.

In the case that the retainer is mounted directly to the linkage member 6 or through the retainer carrier 50, the relative movement between the linkage members 5 and 6 enables the retainer 15 to be selectively positioned and also to make shorter each spaced interval between the engageable portions 13 due to a small relative motion of the same. Accordingly, when located at any interval, the ball 15c may smoothly be [in engagement] *engaged* with any one of engageable portions 13.

When the retainer-carrier 50 is, as shown in FIGS. 11 and 12, pivotally mounted to the linkage member through the pin 51, a coiled spring 53 is, as shown in FIG. 11, fitted around the pin 50 so as to always urge the body of the retainer carrier 50 in abutment against the inner surface of the vertical wall of the linkage member 6 and also an adjusting screw bolt 52 is mounted to the vertical wall of the linkage member 6 for being screwable to move the retainer-carrier 50 so that the retainer 15 may be freely selectively positioned to be engageable with each of the engageable portions 13. Thus the guide pulleys 11a selectively meet a proper sprocket of the multi-speed transmitting freewheel (not shown).

For adjusting the retainer-carrier 50 in position, firstly, the guide pulleys 11a are, in the same manner as the aforesaid embodiment, set in position corresponding to each sprocket of the multi-speed transmitting freewheel, and then, the bolt 52is screwed forward and backward to make the carrier 50 swingingly movable around the pin 51 so that the retainer 15 may properly be insertably engaged with each of the [engageably] *engaged* portions 13 at the set position, e.g., the low speed stage.

As is clearly understood from the abovementioned description, the invention is directed to employ two control wires for the speed-change operation and to keep the derailleur at a selected speed-change position by means of the positioning device provided therein. Resultantly, there is no need for a derailleur to be provided with a return spring as in a conventional one and [also to apply] the frictional resistance [to] *of* the operating side member thereof [whereby] *is diminished, and* the control wires may be pulled to operate the wind-up body with a minute strength applied to the lever.

Furthermore, the positioning device makes it possible to exactly keep the derailleur in a speed-change position and is so located between the static and the movable members that the speed-change operation can be *constantly* carried out [constantly] exactly in spite of producing a surplus extension of the control wires, resulting in no trouble such as the driving chain becoming inaccurately engageable with the sprocket; thus, the desirable bicycle-speed-change is always exactly performed by means of the derailleur of the invention.

In addition, the term engageable portions in the abovementioned description, includes grooves other than through holes as shown in FIGS. 4 and 13, which portions are functional to be engageable with the retainer, and may be substituted with permanent magnet pieces as shown in FIG. 14. In this instance, the ball 15c of the retainer 15 is replaced by a permanent magnet piece 15d. Namely, a cylindrical holder 15a supports a columnar permanent magnet 15d projecting at the N pole or S pole thereof from the holder 15a [on the other hand,] the holder 12 is provided with a plurality of columnar permanent magnets 131 at spaced intervals similar to those of the engageable portions 13, where each one end of these magnets 131 facing the magnet 15d, has a pole different from the opposite end of the magnet 15d. That is, the N or S pole of each of the magnets 131 faces the S or N pole of the magnet 15d respectively.

Thus, when relatively moved, the holder 12 and the retainer become magnetically engageable with each other at a given position due to the attractive force between the different poles of magnets of the two members, thereby making it possible to maintain the guide pulleys at the engaged position.

Incidentally, a plurality of permanent magnets 131 at the holder 12 may have at each interval therebetween each permanent magnet facing the magnet 15d of the retainer 15 in a manner that the opposite ends of both magnets are of the same polarity, that is, the N or S pole of the former to the N or S of the latter; thus, the retainer 15 may smoothly be shifted in engagement even if the holder 12 is made of magnetic material of a small magnetism. Also, the holder 12 and the retainer 15 may be positioned at any one of the four members: the fitting member 1, the linkage members 5 and 6, and the movable member 9. Namely, the holder 12 may be mounted to the fitting member 1 and the retainer 15 to the movable member 9 or the linkage member 5, the holder 12 to the movable member 9 and the retainer 15 to the fitting member 1 or the linkage member 5, or the holder 12 to one linkage member 5 and the retainer 15 to the other linkage member 6, the movable member 9 or the fitting member 1. Briefly, it is sufficient to mount both the holder 12 and the retainer 15 onto two relatively movable members as aforegoing.

While the embodiments of the invention have been shown and described, the invention is not limited to the specific construction thereof, which is merely exemplified in the specification rather than is defined.

What is claimed is:

1. A derailleur for a bicycle, which is pulled by [control wires] *at least one control wire* to change the speed of the bicycle by moving a driving chain to a selective sprocket of a freewheel, said derailleur comprising:

a. four members including a first fitting member, second and third linkage members each pivotally mounted at one end to said fitting member, and a fourth movable member pivotally supported at one end to each other end of said linkage members, said linkage members being swingable with respect to said fitting member and with respect to each other, said fourth movable member being swingable with respect to said linkage members and to said fitting member;

b. cages coupled to the other end of said fourth movable member and having two chain guide pulleys freely movable with said fourth movable member to move the driving chain; and c. means, coupled on two of said four members which are movable with respect to each other, for maintaining the position of said cages, said maintaining mean including a holder on one of said two members and having a plurality of engageable portions, and a retainer on the other of said two members and engageable with any one of said engageable portions.

2. The derailleur according to claim 1, wherein said holder is on said fitting member, and said retainer is on another member movable with respect to said fitting member.

3. The derailleur according to claim 2, wherein said retainer is on said fourth movable member.

4. The derailleur according to claim 2, wherein said retainer is on one of said linkage members.

5. The derailleur according to claim 2, wherein said holder is formed of a plate extending from one end to another end toward said fourth movable member, said other end of said holder having said plurality of engageable portions, said engageable portions each having a given spaced interval therebetween along the path of motion said member carrying said retainer thereon and swingingly moving with respect to said fitting member.

6. The derailleur according to claim 1, wherein said holder is on said fourth movable member and said retainer is on another member movable with respect to said fourth movable member.

7. The derailleur according to claim 6, wherein said retainer is on said fitting member.

8. The derailleur according to claim 6, wherein said retainer is on one of said linkage members.

9. The derailleur according to claim 6, wherein said holder is formed of a plate extending from one end to another end toward said fitting member, said other end of said holder having said plurality of engageable portions, said engageable portions each having a given spaced interval therebetween along the path of motion of the member carrying said retainer thereon and swingingly moving with respect to said fourth movable member.

10. The derailleur according to claim 1, wherein said holder is on one of said linkage members and said retainer is on another member movable with respect to said one linkage member carrying said holder thereon.

11. The derailleur according to claim 10, wherein said retainer is on the other of said linkage members, said linkage members being opposite one another.

12. The derailleur according to claim 10, wherein said retainer is on said fitting member.

13. The derailleur according to claim 10, wherein said retainer is on said fourth movable member.

14. The derailleur according to claim 10 wherein said one of said linkage members includes a vertical wall and a horizontal wall extending at a right angle to said vertical wall, said horizontal wall including said holder, and further comprising carrier means connected to the other of said linkage members, said retainer being mounted on said carrier means, said linkage members being opposite one another.

15. The derailleur according to claim 1, wherein said retainer comprises a ball and a helical coiled spring urging the ball toward said holder.

16. The derailleur according to claim 1, wherein the engageable portions of said holder include dish-like shaped recesses, respectively, said recesses being interconnected with each other by means of chevron shaped intervals.

17. The derailleur according to claim 1, wherein said engageable portions of said holder include first permanent magnets, respectively, and said retainer includes a second permanent magnet which faces any one of said first magnets, the magnetic poles of said first and second magnets facing each other being different from one another.

18. The derailleur according to claim 17, wherein said first magnets are spaced apart from one another and further comprising at each spaced interval between said first permanent magnets a third permanent magnet, said second magnet and said third magnet facing each other with the same magnetic pole.

19. A derailleur for a bicycle, which is pulled by [control wires] *at least one control wire* to move cages having two chain guide pulleys to move a driving chain to a selective sprocket of a freewheel to change the speed of the bicycle, said derailleur comprising:

a. four members including a first fitting member, second and third linkage members each pivotally mounted at one end to said fitting member, and a fourth movable member pivotally mounted at one end to each other end of said linkage members, said linkage members being swingable with respect to said fitting member and with respect to each other, said fourth movable member being swingable with respect to said linkage members and to said fitting member, said fourth movable member at its other end being connectable to the cages; and b. means for maintaining the position of the cages including a holder having a plurality of engageable portions, and a retainer selectively engageable with any one of said engageable portions, wherein one of said holder and said retainer is mounted swingingly on one of said four members so that the position of said holder and said retainer is adjustable relative to each other.

20. The derailleur according to claim 19, wherein said holder is pivotally mounted on said one of said four members so that the position of said holder is adjustable relative to said retainer, and further comprising fixing means for fixing said holder on said one member in an adjusted position.

21. The derailleur according to claim 19, wherein said retainer is pivotally mounted on said one of said four members so that the position of said retainer is adjustable relative to said holder, and further comprising fixing means for fixing said retainer on said one member in an adjusted position.

22. The derailleur according to claim 21 wherein said fixing means includes an adjuster pivotally mounted on one of said linkage members, said retainer being mounted on said adjuster, and an adjusting bolt to move said adjuster to adjust and fix said retainer in the adjusted position.

23. A derailleur for a bicycle which is pulled by control wires to move cages having two chain guide pulleys to move the driving chain to a selective sprocket of a freewheel to change the speed of the bicycle, said derailleur comprising:

a. four members including a first fitting member, second and third linkage members each pivotally mounted at one end to said fitting member, and a fourth movable member pivotally mounted at one end to each other end of said linkage members, said linkage members being swingable with respect to said fitting member, said fourth movable member being swingable with respect to said fitting member and to said linkage members, said fourth movable member at its other end being connectable to the cages;

b. [means, connected to at least one of said four members, for maintaining the position of the cages;] *means, coupled on two of said four members which are movable with respect to each other, for maintaining the position of said cages, said maintaining means including a holder on one of said two members and having a plurality of engageable portions, and a retainer on the other of said two members and engageable with any one of said engageable portions;* and c. means, between said fitting member and another of said four members movable with respect to each other, for moving said fourth movable member, including two control wires, a movable plate having two arms respectively retaining terminals of said wires, and a plate fixed to said fitting member and opposite said movable plate, said fixed plate having means for guiding said wires to said movable plate.

24. The derailleur according to claim 23, wherein said fixed plate including means for guiding said wires has a pin fixed thereto, and said movable plate has a fork end having a cutout engageable with said pin so that said movable plate may be turned under regulation of said cutout and pin.

25. The derailleur according to claim 23, further comprising a lever means to operate said two wires, said lever means comprising a rotatable body for winding-up said wires thereon, and a handle extending from said body for rotatably operating said body so that said body may be rotatable in a first direction and a second direction which is the reverse of said first direction.

*26. The derailleur according to claim 1, further comprising a lever means to operate said at least one control wire, said lever means comprising a rotatable body for winding-up said wire thereon, and a handle extending from said body for rotatably operating said body so that said body may be rotatable in a first direction and a second direction which is the reverse of said first direction.*

* * * * *